United States Patent [19]

Srivastava et al.

[11] 4,446,482

[45] May 1, 1984

[54] SYSTEM FOR GENERATING 2H PULSES IN A TELEVISION RECEIVER

[75] Inventors: Gopal K. Srivastava, Buffalo Grove; Stephen H. Lai, Streamwood, both of

[73] Assignee: Zenith Radio Corporation, Glenview, Ill.

[21] Appl. No.: 365,421

[22] Filed: Apr. 5, 1982

[51] Int. Cl.³ .................... H04N 9/40; H04N 5/06
[52] U.S. Cl. ............................ 358/150; 358/20
[58] Field of Search .............. 358/150, 151, 21 R, 358/319, 20

[56] References Cited

U.S. PATENT DOCUMENTS

| | | | |
|---|---|---|---|
| 3,716,795 | 2/1973 | Brown | 358/150 |
| 3,777,063 | 12/1973 | Meacham | 358/150 |
| 4,156,254 | 5/1979 | Marino | 358/150 |
| 4,360,825 | 11/1982 | Srivastava | 358/150 |

Primary Examiner—Tommy P. Chin

[57] ABSTRACT

A system for generating 2H pulses by counting cycles of reference signals whose frequency is related to the frequency of a color subcarrier signal. In one embodiment, four such reference signals are provided, each phase separated from the other by ninety degrees. A counter receives one of the reference signals for counting its cycles up to a preselected integral count. When the preselected count is reached, further circuitry generates an output pulse for clearing the counter and holding it cleared while the next reference signal is applied to the counter. The cycle of counting reference signal cycles, clearing the counter, and applying the next reference signal to the counter continues such that the four reference signals are applied to the counter sequentially. By proper selection of the integral count reached by the counter and the duration of its cleared state, the output pulses are developed at a 2H rate.

12 Claims, 6 Drawing Figures

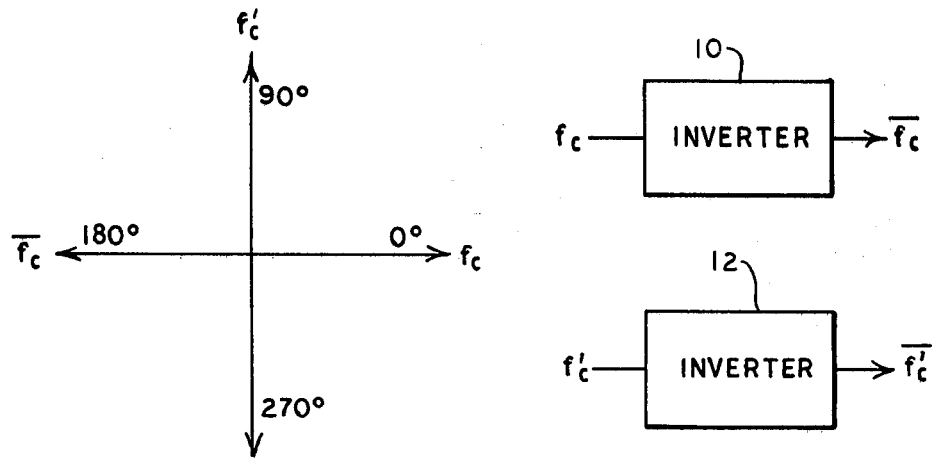
FIG. 1
FIG. 2
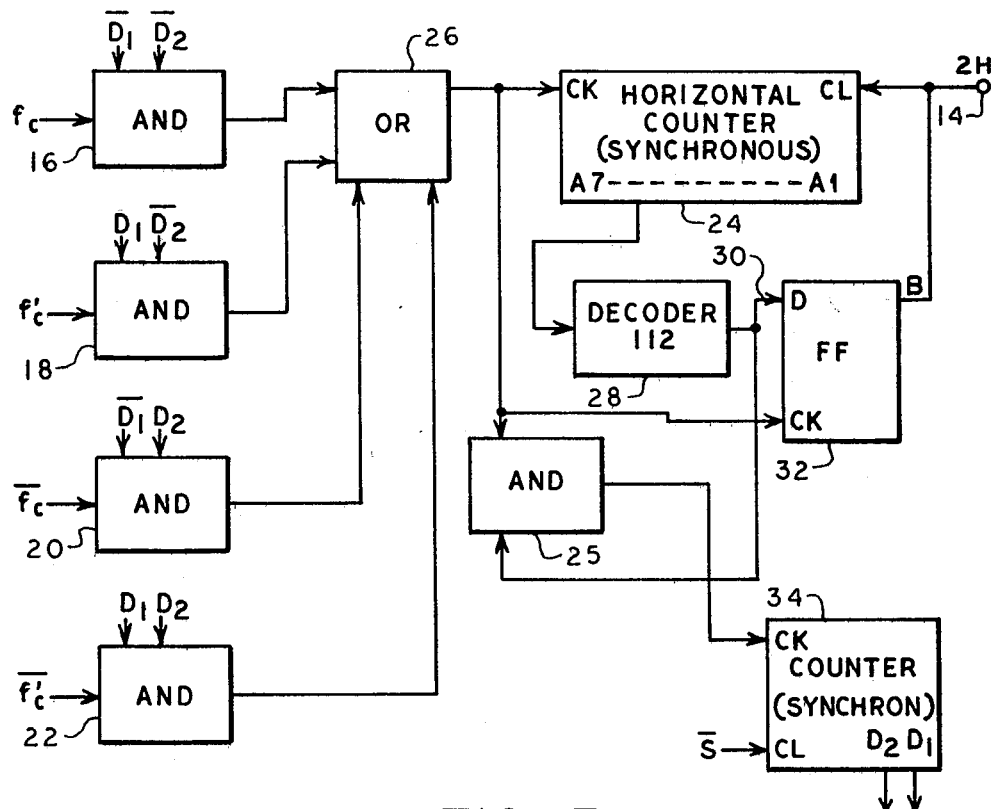
FIG. 3

SYSTEM FOR GENERATING 2H PULSES IN A TELEVISION RECEIVER

BACKGROUND OF THE INVENTION

This invention is directed generally to improvements in television receivers. It is particularly directed to an improved system for developing sync pulses whose frequency is twice the frequency of conventionally broadcast sync pulses.

In many television receivers, synchronization of vertical scan is achieved by developing "2H" pulses whose frequency is twice the normal (15.73 kilohertz) horizontal scan frequency, and by counting down or dividing the 2H pulses by a constant factor to develop vertical rate pulses. To drive the receiver's horizontal scan at the nominal 1H rate, the 2H pulses may merely be divided by a factor of two.

To develop the 2H pulses, it is conventional to modify the receiver's color oscillator to operate at a frequency of four times fc, where fc is the frequency (approximately 3.58 megahertz) of the color subcarrier. A counter then divides the 4fc signal by a factor of 455 to develop the 2H pulses.

Although the conventional approach to developing the 4fc signal results in satisfactory operation, it does have certain drawbacks. For example, a crystal capable of oscillating at 4fc is usually required. Because such crystals are non-standard in the television industry, their use imposes a cost penalty.

Another drawback results from the fact that the use of a 4fc signal requires the countdown circuits to operate at a frequency in excess of 14 megahertz. Since operation at such a high frequency pushes the limits of presently available technology, the yield of such countdown circuitry is reduced.

Despite the previously mentioned problems, the 4fc signal continues to be used to develop the 2H pulses because the frequency of the 4fc signal is related to the frequency of the 2H pulses by an integer (455). This relationship makes the counting down process relatively straight forward. To count down to 2H from the nominal fc signal would overcome the foregoing problems, but it requires division by a non-integer, a process which digital circuitry has heretofore been unable to achieve effectively and inexpensively. Hence, the conventional approach has continued to be used, despite its attendant problems.

OBJECTS OF THE INVENTION

It is a general object of the invention to provide an improved system for developing 2H pulses in a television receiver.

It is a more specific object of the invention to provide a reliable and inexpensive system which generates 2H pulses from a relatively low frequency color subcarrier signal to thereby avoid the problems which attend the use of a 4fc signal.

BRIEF DESCRIPTION OF THE FIGURES

The objects stated above and other objects of the invention are set forth more particularly in the following detailed description and in the accompanying drawings of which:

FIG. 1 is a phase diagram illustrating four reference signals whose cycles are counted by one embodiment of the present system to develop 2H pulses;

FIG. 2 illustrates exemplary circuitry for developing phase complimentary signals from a pair of color subcarrier signals normally present in a color television receiver;

FIG. 3 depicts an embodiment of the present system for developing 2H pulses from the signals depicted in FIG. 1;

DESCRIPTION OF THE PREFERRED EMBODIMENT

Figure 4:
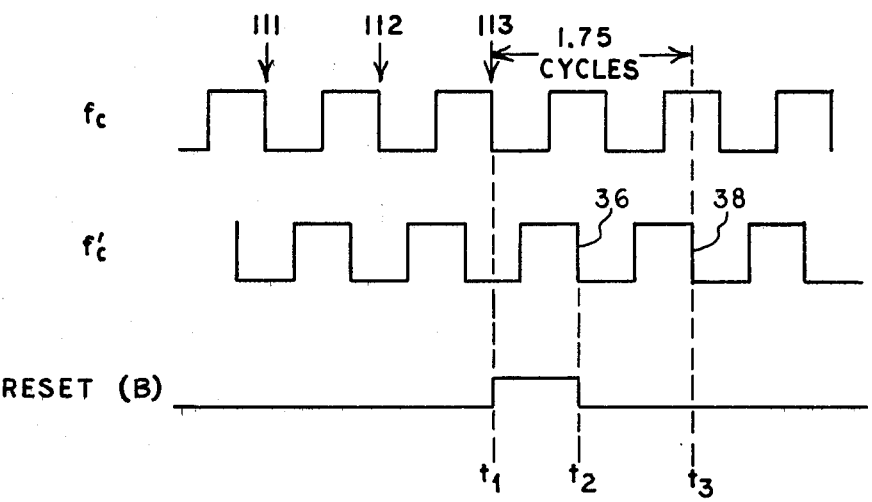
FIGS. 4 and 5 show various waveforms useful in explaining the operation of the system shown in FIG. 3.

As stated previously, the frequency of a 4fc signal is exactly 455 times the frequency of 2H pulses. The frequency of the nominal fc signal is exactly 133.75 times the frequency of the 2H pulses. Because 113.75 is a mixed number, i.e., a non-integer, conventional receivers do not divide the nominal fc signal to obtain the 2H pulses. However, one embodiment of the present system divides the nominal fc signal by an integer in a manner which simulates division by a non-integer, thereby developing 2H pulses without the need for a non-standard 4fc oscillator. In another embodiment, a 2fc signal is similarly divided to develop 2H pulses. The embodiment which operates on the nominal fc signal is described first.

In the first embodiment, four reference signals are used, each having a frequency (fc) equal to the frequency of the color subcarrier. The phases of the four reference signals differ from each other such that these reference signals can be counted sequentially to simulate their division by a mixed number.

Referring to FIG. 1, a phase diagram is shown to illustrate the various phases of the four reference signals used by the embodiment depicted in FIG. 3. The first reference signal fc is shown as having an arbitrary phase of zero degrees, the second reference signal fc' has a phase of 90 degrees, the third reference signal $\overline{fc}$ has a phase of 180 degrees, and the fourth reference signal $\overline{fc'}$ has a phase of 270 degrees. Thus, the reference signals are staggered from each other by 90 degrees.

In conventional television receivers, the signals fc and fc' are developed for use in demodulating the color component of the television signal. Hence, these signals (fc and fc') need not be specially derived for present purposes. Their phase compliments $\overline{fc}$ and $\overline{fc'}$ may be developed as shown in FIG. 2. As shown, an inverter 10 inverts fc to develop $\overline{fc}$, and other inverter 12 inverts fc' to develop $\overline{fc'}$.

Referring now to FIG. 3, a preferred system is shown for counting cycles of the four reference signals so as to develop 2H pulses at an output terminal 14. The four reference signals, each having a frequency equal to the color subcarrier frequency, are individually applied to AND gates 16, 18, 20 and 22. These AND gates are enabled by binary signals for sequentially coupling the reference signals to the clock input of a counter 24, to an AND gate 25, and to the clock input of a flip-flop 32 via on OR gate 26.

The counter 24 may be a conventional synchronous counter which counts pulses or cycles associated with its clock input to develop outputs $A_1$ through $A_7$ corresponding to the count attained. These outputs are sensed by a decoder 28 for developing an output at lead 30 whenever the counter 24 reaches a preselected integral count.

The decoder's output on lead 30 is coupled to the data input of a flip-flop 32, whereby the latter device develops an output pulse B each time the counter 24 reaches its preselected count and upon being clocked by the output of the OR gate 26. The output B is coupled to the clear input of the counter 24 and to the output terminal 14. The output of the decoder 28 is also coupled to one input of the AND gate 25 whose output clocks a synchronous counter 34 when both inputs to the AND gate 25 are high.

The counter 34 develops binary output signals $D_1$, $D_2$ whose value changes each time the counter is clocked. Each such clock occurs when the output of the decoder 28 goes high and the next negative going edge of a reference signal is received from the OR gate 26. Thus, being clocked four successive times changes the values of these binary signals from $\overline{D_1}$, $\overline{D_2}$ (0, 0) to $D_1$ $\overline{D_2}$ (0,1) to $\overline{D_1}$, $D_2$ (1, 0), and to $D_1$, $D_2$ (1, 1), and to $D_1$, $D_2$ (1, 1). The signals $D_1$, $D_2$ are applied to the AND gates 16, 18, 20 and 22 to sequentially enable them and to cause the four reference signals to be sequentially coupled to the clock input of the counter 24.

After the counter 24 counts a preselected integral number of cycles of one of the reference signals, the flip-flop 32 generates an output pulse B which clears the counter 24 such that the next successive count therein (from a different reference signal switched to the counter 34) occurs after a mixed number of reference signal cycles. As described in more detail below, the integral count sensed by the decoder 28 and the mixed number of references signal cycles during which the counter 24 remains cleared are selected to cause the pulses B to occur at a 2H rate.

In the present embodiment, the decoder 28 generates its output when it senses that the counter 24 has reached count of 112. Thus, the data input of the flip-flop 32 is driven high after 112 cycles of the reference signal. Upon the next negative-going edge (the 113th cycle) of a reference signal received from the OR gate 26, the B output of the flip-flop goes high. The flip-flop 32 then holds the counter 24 cleared for 0.75 cycles of the reference signal. The manner in which the present system operates within these constraints will now be described.

Assume that the AND gate 16 has been enabled and that the counter 24 has counted 110 cycles of the reference signal fc. Assume further that the counter 24 is a negative edge triggered device. As shown in FIG. 4, the next two negative-going edges of fc will produce counts 111 and 112 in the counter 24. The decoder 28 responds to the count of 112 by generating a high output on the lead 30 at the data input of the flip-flop 32 and at the enabling input of the AND gate 25. Consequently, the B output of this flip-flop is driven high when clocked by the output of OR gate 26 at time $t_1$. Since B is high, the counter 24 is cleared. The counter 24 remains cleared by the pulse B until time $t_2$, wherefore its counting state remains at zero between $t_1$ and $t_2$.

When the AND gate 25 has been enabled by the decoder 28, the negative-going edge of the next reference signal cycle clocks the counter 34. Hence, its binary outputs change to $D_1$, $\overline{D_2}$ for disabling AND gate 16 and enabling the AND gate 18. Consequently, the reference signal fc' is coupled to the OR gate 26. Thus, at time $t_2$, the counter 24 is receiving the signal fc' rather than fc. However, the first negative edge 36 of fc' is not counted because the counter 24 is still cleared. That same first negative edge is coupled to the clock input of the flip-flop 32 for driving its B output low, thereby enabling the counter 24. Accordingly, when the next negative edge 38 occurs at time $t_3$, the counter 24 begins counting. It can be seen, therefore, that the counter reaches a count of one at time $t_3$ even though 1.75 cycles of a reference signal have occurred between times $t_1$ and $t_3$. Thus, when a count of two is reached, 2.75 reference signal cycles will have elapsed; when a count of 112 is reached, 112.75 reference signal cycles will have elapsed.

Figure 5:
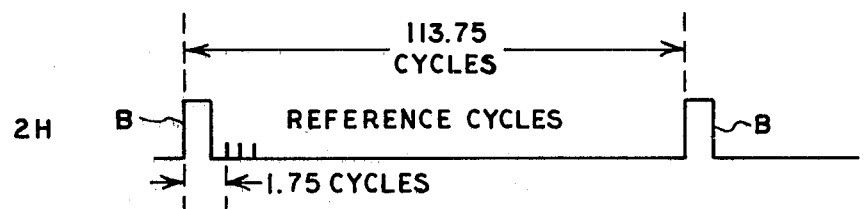

When 113 cycles of the signal fc' have occured, the counter 24 becomes cleared again by another pulse B, and the counter 34 disables AND gate 18 and enables AND gate 20. After the clear interval $(t_1-t_2)$ the counter begins counting cycles of $\overline{fc}$. After 113 such cycles have elapsed, another pulse B is developed, the counter 24 is cleared, and the counter 34 is clocked to change its output to $D_1D_2$. Hence, the AND gate 22 becomes enabled and the counter 24 begins counting cycles of $\overline{fc'}$ after its clear interval. The cycle continues with the counter 34 cyclically enabling the gates 16, 18, 20 and 22 for sequentially applying applying the four reference signals to the counter 24. Each time the counter reaches a count of 112, the output of the decoder 28 goes high. The output pulse B is developed on the next successive reference cycle for holding the counter 24 reset for 0.75 cycles. Accordingly, an output pulse B is generated for each 113.75 cycles of a reference signal as shown in FIG. 5. Thus, the output pulses B occur at twice the horizontal scan frequency for use as 2H pulses in a countdown system.

Referring to the counter 34, it is shown as including an optional clear input receiving a signal identified as $\overline{S}$. This signal may be generated conventionally to indicate that the receiver is in a non-standard mode; that is, a non-standard signal is being received whose horizontal scan rate is not locked to fc. When the signal $\overline{s}$ occurs, it sets the output of the counter 34 to a fixed state to select a single reference signal for input to the counter 24. Thus, in a non-standard mode, the cycles of only one of the four reference signals are counted.

Figure 6:
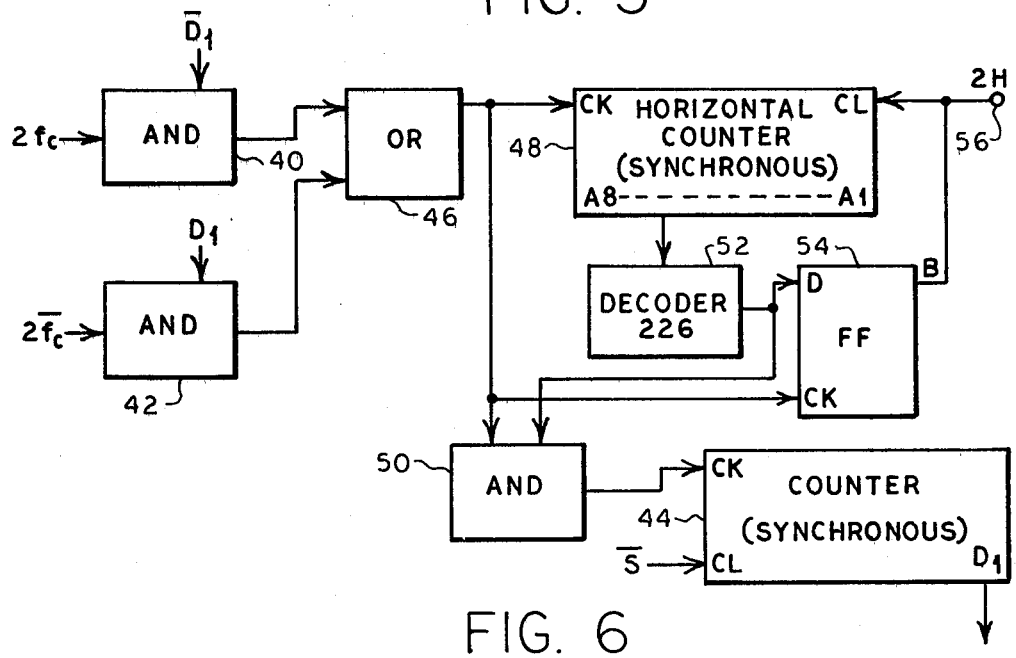
FIG. 6 depicts an alternate embodiment of the present system for developing 2H pulses.

The principles employed by the embodiment described above may also be utilized in a television receiver which generates 2fc signals (twice the frequency of the nominal color subcarrier). Although operating at the frequency of the nominal subcarrier is preferred for most applications, operating at 2fc is still easier than operating conventionally at 4fc. An embodiment which generates 2H pulses from 2fc reference signals is shown in FIG. 6, to which reference is now made.

As shown, an AND gate 40 receives a reference signal whose frequency is equal to 2fc. Another AND gate 42 receives a complimentary reference signal designated as $\overline{2fc}$ which may be obtained by inverting the 2fc signal. These AND gates are enabled sequentially by binary signals $D_1$ and $\overline{D_1}$ which are generated by a synchronous counter 44.

The AND gates 40, 42 are coupled to an OR gate 46 whose outputs are coupled to the clock input of a synchronous counter 48, to one input of an AND gate 50, and to the clock input of a flip-flop 54. The counter 48 operates similarly to the counter 24 (FIG. 3) in that it counts the cycles of either the 2fc or $\overline{2fc}$ signals and outputs to a decoder 52 a signal or signals indicative of the count attained.

The function of the decoder 52 is similar to the function of the decoder 28 (FIG. 3) in that it senses when the counter 48 reaches a preselected integral count which, for this embodiment, is 226. When the count of 226 is sensed, the decoder 52 generates a high output to drive the data input of the flip-flop 54 high and to enable the AND gate 50. In response to the next reference signal cycle from OR gate 46, the flip-flop 54 generates a signal B which is applied to the clear input of the counter 48 and to an output terminal 56.

As with the embodiment of FIG. 3, the $D_1$ output of the counter 44 responds to the output of the AND gate 50 by changing its logic level for disabling one of the AND gates 40, 42 and for enabling the other one.

Assuming that the gate 40 is now initially enabled, the 2fc signal is coupled to the counter 48, to the AND gate 50, and to the flip-flop 54. Since the counter 48 is still held in a clear state by the B output of the flip-flop 54, the first negative-going edge of the 2fc signal is not counted. However, that first negative edge is coupled to the clock input of the flip-flop 54. The B output of the flip-flop 54 is driven low to enable the counter 48 for counting the next negative-going edge of the signal $2\overline{fc}$. Consequently, the counter 48 attains its first count after 1.5 cycles of the reference signal 2fc, and reaches a count of 226 after 226.5 cycles of the reference signal. When the next successive negative edge of the reference signal occurs, the B output of the flip-flop 54 is again driven high, the state of the output from the counter 44 is switched, and the 2fc signal is applied to the counter 48.

It can be seen that the counter 48 is held in a cleared condition for 0.5 reference signal cycles, and the decoder 52 senses the counter 48 reaching a selected integral count (226) for driving high the data input of flip-flop 54. The B output of this flip-flop goes high at the 227th cycle of the reference signal. This cycle continues such that the B output of flip-flop 54 corresponds to 2H pulses.

From the foregoing description, it will be apparent that the present system develops 2H pulses utilizing a relatively small number of conventional circuit components. Crystal oscillators operating at 4fc are eliminated, and the various components are permitted to operate at lower frequencies. Accordingly, a less expensive but equally reliable system is provided for developing 2H pulses for use in a television receiver employing a countdown system.

Although the invention has been described in terms of a preferred embodiment, it will be obvious to those skilled in the art that many alterations and modifications may be made without departing from the invention. Accordingly, it is intended that all such alterations and modifications be considered as within the spirit and scope of the invention as defined by the appended claims.

What is claimed is:

1. In a television receiver which develops a color subcarrier signal, a system for generating 2H pulses, comprising:
    means providing a plurality of reference signals whose frequencies are related to the frequency for the color subcarrier;
    means for counting cycles of the reference signals;
    control means coupled to said counting means for generating an output pulse after each time the counting means reaches a preselected integral count, each of the output pulses being coupled for clearing the counting means so that the next successive count thereof occurs after a mixed number of reference signal cycles for generating successive ones of the output pulses at a rate equal to twice nominal horizontal scan rate; and
    means for sequentially coupling the reference signals to the counting means such that the counting means receives a different reference signal in response to each of the output pulses,
    whereby the output pulses constitute said 2H pulses.

2. A system as set forth in claim 1 wherein said plurality of reference signals comprise first, second, third and fourth reference signals, each having a frequency equal to the frequency of the color subcarrier signal, the first reference signal having a given phase, the second reference signal having a phase which is offset by ninety degrees from the phase of the first reference signal, the third reference signal having a phase which is offset from the phase of the second reference signal by ninety degrees, and the fourth reference signal having a phase which is offset from the phase of the third reference signal by ninety degrees.

3. A system as set forth in claim 2 wherein said integral count comprises 112, and said mixed number comprises 1.75.

4. A system as set forth in claim 1 wherein said plurality of reference signals comprise two oppositely phased reference signals, each reference signal having a frequency equal to twice the frequency of the color subcarrier signal.

5. A system as set forth in claim 4 wherein said integral count comprises 226, and said mixed number comprises 1.5.

6. A system as set forth in claim 1 wherein said means for sequentially coupling the reference signals to the counting means includes a plurality of gates, each receiving one of the reference signals and each responsive to a different binary signal for coupling its received reference signal to the counting means, and means responsive to said counting means reaching said preselected integral count for developing a different one of the binary signals to enable a respective one of said gates.

7. A system as set forth in claim 6 wherein said control means includes a decoder for generating an output responsive to each time the counting means reaches said integral count, and a flip-flop receiving the decoder's output for generating said output pulses.

8. A system as set forth in claim 7 wherein said means for developing binary signals includes an AND gate receiving the reference signal coupled to the counting means and enabled by the decoder's output, and a counter clocked by said AND gate.

9. In a television receiver which develops a color subcarrier signal, a system for generating 2H pulses, comprising:
    means providing first, second, third, and fourth reference signals whose frequencies are equal to the frequency of the color subcarrier, the first reference signal having a given phase, the second reference signal having a phase which is offset by ninety degrees from the phase of the first reference signal, the third reference signal having a phase which is offset from the phase of the second reference signal by ninety degrees, and the fourth reference signal having a phase which is offset from the phase of the third reference signal by ninety degrees;
    means for counting cycles of the reference signals;

a decoder for developing an output in response to each time the counting means reaches a preselected, integral count;

a flip-flop receiving the decoder's outputs and clocked by a reference signal received by said counting means for generating a plurality of output pulse each being coupled for clearing the counting means such that the next successive count thereof occurs after a mixed number of reference signals cycles for generating successive ones of said output pulses at a rate equal to twice nominal horizontal scan rate;

an AND gate enabled by the decoder's output and receiving the reference signal applied to the counting means;

a counter responsive to four successive outputs from the AND gate for successively developing four different binary signals; and gate means receiving the binary signals and the four reference signals for outputting to the counting means a different reference signal each time a different binary signal is received, whereby the reference signals are counted sequentially such that the output pulses developed by said flip-flop correspond to said 2H pulses.

10. A system as set forth in claim 9 wherein said integral count comprises 112 and said mixed number comprises 1.75.

11. A system as set forth in claim 10 wherein said gate means includes: four AND gates each receiving a different reference signal and each responsive to a different binary signal from said counter; and an OR gate coupled to the output of each AND gate and coupled to a clock input of said counting means.

12. In a television receiver which develops a color subcarrier signal, a system for generating 2H pulses, comprising:

means providing first, second, third and fourth reference signals whose frequencies are equal to the frequency of the color subcarrier, the first reference signal having a given phase, the second reference signal having a phase which is offset by ninety degrees from the phase of the first reference signal, the third reference signal having a phase which is offset from the phase of the second reference signal by ninety degrees, and the fourth reference signal having a phase which is offset from the phase of the third reference signal by ninety degrees;

four signal coupling gates each receiving a different one of the reference signals and each responsive to a different binary signal for sequentially outputting its received reference signal;

an OR gate coupled to the outputs of said signal coupling gates;

a first counter coupled to the output of the OR gate for counting cycles of the reference signals;

a decoder responsive to each time the first counter reaches a count of 112 for developing an output;

a flip-flop having a data input receiving the decoder's output, a clock input receiving the output of the OR gate, and an output for clearing the first counter for an interval equal to 0.75 cycles of a reference signal;

an AND gate receiving the output of the OR gate and receiving the output of the decoder;

a second counter for successively developing four different binary signals in response to four successive outputs from the AND gate; and means for coupling said binary signals to said signal coupling gates, whereby cycles of the four reference signals are counted such that the output of said flip-flop corresponds to said 2H pulses.

* * * * *